United States Patent [19]

Kern

[11] Patent Number: 4,640,783

[45] Date of Patent: Feb. 3, 1987

[54] OZONE INJECTION METHOD AND APPARATUS

[76] Inventor: Donald W. Kern, 5290 Orcutt Rd., San Luis Obispo, Calif. 93401

[21] Appl. No.: 742,934

[22] Filed: Jun. 10, 1985

[51] Int. Cl.⁴ ............................ C02F 1/78; E04H 3/20
[52] U.S. Cl. .................................. 210/760; 210/765; 210/169; 210/192; 210/242.1; 4/490; 261/DIG. 42; 261/DIG. 75
[58] Field of Search ................... 210/760, 169, 242.2, 210/242.1, 192, 765; 4/490; 261/DIG. 75, DIG. 42, 36 R

[56] References Cited

U.S. PATENT DOCUMENTS

| | | | |
|---|---|---|---|
| 3,326,747 | 6/1967 | Ryan et al. | 167/17 |
| 3,336,099 | 8/1967 | Czulak et al. | 21/102 |
| 3,455,803 | 7/1969 | Miller | 210/760 |
| 3,650,950 | 3/1972 | White | 210/60 |
| 3,665,942 | 5/1972 | Moore . | |
| 3,684,460 | 8/1972 | Arneson | 210/169 |
| 3,758,276 | 9/1973 | Bond et al. | 210/169 |
| 3,765,432 | 10/1973 | Goodin | 4/490 |
| 3,775,314 | 11/1973 | Beitzel et al. . | |
| 3,805,815 | 4/1974 | Goodin | 4/490 |
| 3,823,728 | 7/1974 | Burris | 210/760 |
| 4,019,983 | 4/1977 | Mandt | 210/760 |
| 4,043,913 | 8/1977 | Hintermeister | 210/220 |
| 4,087,286 | 5/1978 | Sexton et al. | 210/169 |
| 4,224,158 | 9/1980 | Molvar . | |

Primary Examiner—Benoit Castel
Attorney, Agent, or Firm—Gordon L. Peterson

[57] ABSTRACT

A apparatus for injecting ozone into the water of a swimming pool comprising a movable head adapted to float on the water in a pool, a water-responsive drive coupled to the head, and at least one flexible conduit coupled to the head and having at least one opening therein. Water under pressure is supplied to the flexible conduit to cause it to move and to the water-responsive drive to cause it to propel the head through the water of the pool. Ozone is injected into the flexible conduit and out of the opening therein to mix with the water in the swimming pool.

9 Claims, 3 Drawing Figures

OZONE INJECTION METHOD AND APPARATUS

BACKGROUND OF THE INVENTION

Chlorine is a commonly used sanitizing agent which sanitizes the water of a swimming pool. More specifically, chlorine sanitizes the pool water by destroying the ability of organics, such as algae, scum, urine, etc., to harmfully or undesirably effect the swimming pool water.

Although chlorine is an effective sanitizing agent, it produces other rather significant problems. For example, the use of chlorine produces a maintenance burden in that it must be periodically added to the pool water. The chlorine is in a compound which is either acidic or basic, and this requires that pH-balancing chemicals also be added to the pool water to maintain approximately neutral pH. The cost of these chemical treatments can be significant. In addition, chlorine produces an undesirable odor and eye irritation for swimmers.

Ozone ($O_3$) is a known substitute for the commercially available chlorine compounds. Ozone produces no eye irritation, does not have an unpleasant odor and has a neutral pH. Ozone has been used successfully to sanitize the water of spas which have a relatively small volume of very turbulent water. However, the use of ozone for swimming pools, which have a much larger volume of essentially non-turbulent water, has been fraught with numerous problems.

Ozone has been injected through the fixed water supply outlets for the pool, but ozone injected in this fashion is not effective in sanitizing all of the pool water. It is also known to provide a large number of fixed ozone-injection ports along the bottom of a swimming pool when the pool is being constructed. When injected in this fashion, ozone is an effective sanitizer. However, an installation such as this is very expensive and cannot be used with an existing pool.

SUMMARY OF THE INVENTION

This invention provides a method and apparatus for injecting ozone into a swimming pool. The invention can be used with either new or existing swimming pools, and an apparatus embodying this invention is quite inexpensive. Although the invention is described in connection with the injection of ozone into a swimming pool, the invention is broadly applicable to the injection of ozone or other gaseous sanitizing agents into the water of a tank, such as a swimming pool or other container for a relatively large quantity of water.

With this invention, ozone is injected through a movable injector into the water of the swimming pool. This provides good mixing of the ozone in swimming pool water so that the ozone can properly perform its sanitizing function. As a result, chlorine treatment can be reduced or eliminated. Although it is preferred to inject the ozone continuously as the injector is moving about the pool, if desired, the ozone injection could be carried out intermittently with the injector at different locations in the pool.

Although movement of the injector may be accomplished in various different ways, it can be inexpensively moved utilizing water under pressure, which is commonly available at the swimming pool. The movement of the injector should be sufficient to provide a thorough mixing of the ozone and the water. Because the ozone tends to bubble to the surface of the water, preferably at least some of the ozone is injected near the bottom of the pool.

One feature of this invention is that the ozone injection can be carried out using a conventional swimming pool cleaner of the type that includes a floatable head and one or more flexible conduits coupled to the head. Water under pressure is supplied to the flexible conduits to cause them to move in snake-like fashion over the side walls and bottom of the pool to dislodge debris from the surfaces and allow it to flow to the main drain of the pool. A water-responsive drive is coupled to the head, and the water under pressure is also supplied to the drive to cause the head to move about the pool. The path of movement of the head may be, for example, random or along the periphery of the pool. One example of a swimming pool cleaner of this type is shown in Moore U.S. Pat. No. 3,665,942.

To adapt a swimming pool cleaner of this type to inject ozone, all that is required is a source of ozone and means for injecting ozone from the source into the conduit means that supplies water under pressure to the flexible conduits. With this arrangement, the ozone is carried through the flexible conduits and out of the openings therein to thoroughly mix with the water as the flexible conduits snake back and forth and as the head moves about the pool. Thus, the flexible conduits serve, not only to clean the walls of the pool, but also to inject and mix the ozone with the water. This is carried out very inexpensively by the simple addition of an ozone and an appropriate mechanism to inject the ozone into the water supply.

The source of ozone may comprise an ozone generator. The means for injecting may include a nozzle having a throat through which water under pressure can flow and a conduit for coupling the ozone generator to the throat.

The water-responsive drive typically includes a jet which discharges water under pressure into the pool. With this invention, the water under pressure has ozone entrained therein so that the discharge of this water serves the dual functions of propulsion of the floatable head and the injection of ozone into the water of the pool.

The invention, together with additional features and advantages thereof, may best be understood by reference to the following description taken in connection with the accompanying illustrative drawing.

DESCRIPTION OF THE PREFERRED EMBODIMENT

Figure 1:
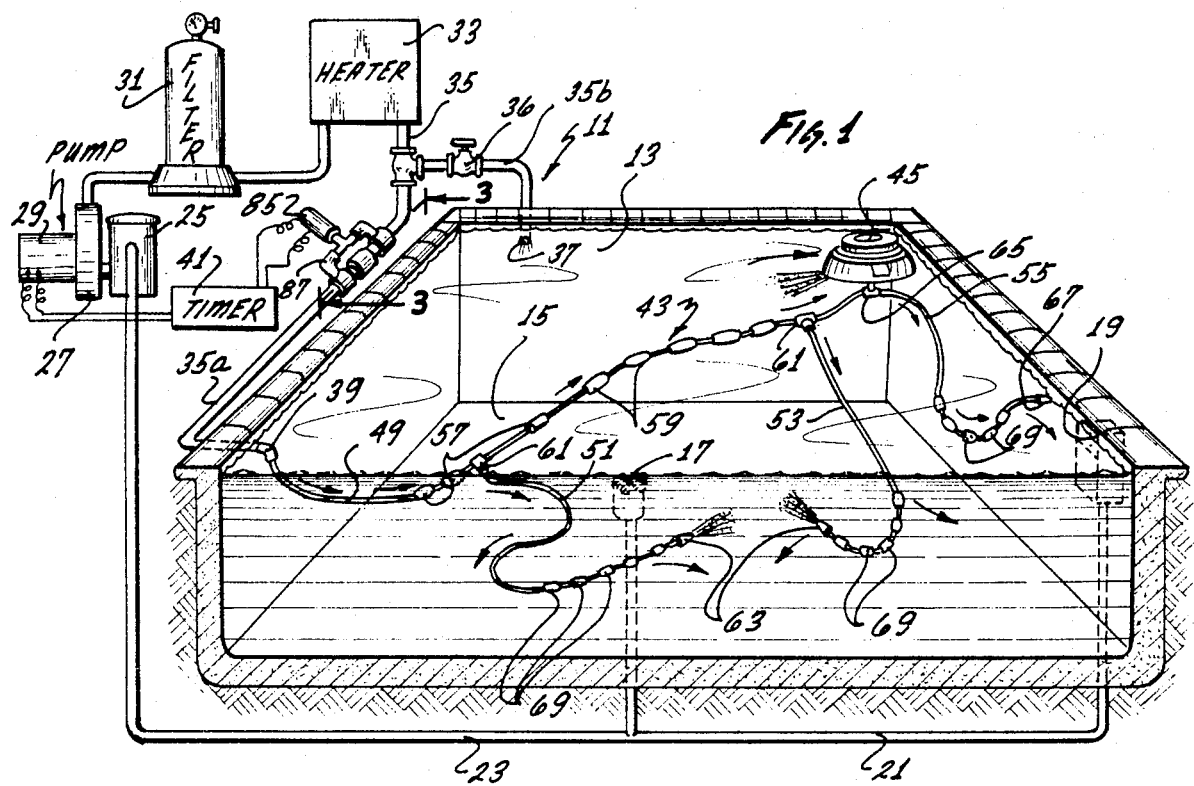
FIG. 1 is a partially schematic, perspective view illustrating an ozone-injecting cleaner constructed in accordance with the teachings of this invention and a swimming pool.

FIG. 1 shows a swimming pool 11 which generally comprises a peripheral wall 13, a bottom wall 15, a main drain 17 in the bottom wall, a surface skimmer 19 in the peripheral wall, a skimmer return line 21 and a main drain return line 23. The skimmer return line 21 feeds water and surface debris from the pool into the main drain return line 23, and the latter extends through a filter 25 to the intake of a pump 27. The pump 27, which is driven by a motor 29, discharges the water through a filter 31, a heater 33, supply conduits 35, 35a and 35b, a manual control valve 36, and ports 37 and 39 in the peripheral wall 13 of the pool 11. The motor 29 runs intermittently and is controlled by a timer 41. Make-up water can be provided to the pool and desired.

Figure 2:
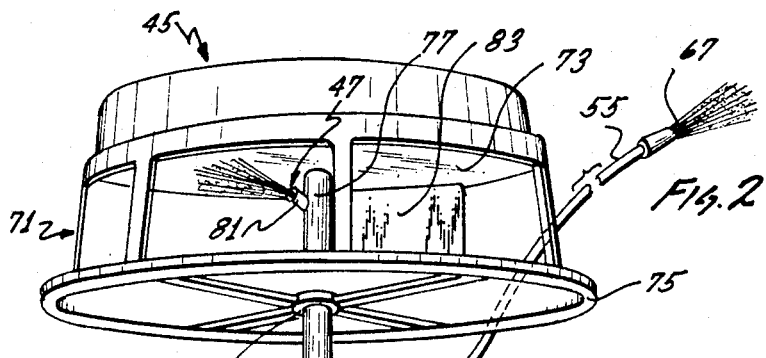
FIG. 2 is an isometric view of the floatable head and of two of the flexible conduits.

Coupled to the supply conduit 35a at the port 39 is a swimming pool cleaner 43, which may be conventional. Generally, the cleaner 43 includes a movable head 45 adapted to float on the water of the pool, a water-responsive drive 47 (FIG. 2) coupled to the head, a flexible header 49 joined to the port 39 to receive water from the supply conduit 35a, and flexible conduits 51, 53 and 55 coupled to the flexible header 49. The header 49 has swivels 57 and a plurality of line floats 59 to keep the header from becoming totally submerged as it extends from the port 39 to the head 45.

The supply conduit 35a and the header 49 cooperate to define conduit means for supplying water under pressure to the flexible conduits 51, 53 and 55. The flexible conduits 51 and 53 are joined to the header 49 by T's 61, and each of them has a discharge opening 63 at its distal end. The flexible conduits 51 and 53 receive water under pressure from the header 49, and this water is discharged through the discharge openings 63 into the pool. Consequently, the flexible conduits 51 and 53 are caused to whip or snake along the bottom wall 15 of the pool 11 to dislodge dirt and debris and cause it to move toward, and out through, the main drain 17. Similarly, the flexible conduit 55 is joined to the header 49 by a "T" 65 and has a discharge opening 67 at its distal end. The flexible conduit 55 also receives water under pressure from the header 49, and this water is discharged through the discharge opening 67 to cause the flexible conduit 55 to snake vertically along the peripheral wall 13 to remove debris and dirt from the peripheral wall and allow it to move toward and through the main drain 17. Wear rings 69 may be provided on the flexible conduits 51, 53 and 55 as desired.

Although the head 45 may take different forms, in the embodiment illustrated, it comprises a frame 71 (FIG. 2) carrying a float 73 above a spider or base 75. The head 45 is coupled to the "T" 65 by a tube 77, which contains a bearing 79 that allows the head to swivel relative to the "T" 65. In this embodiment, the drive 47 includes a jet or nozzle 81, pivotally coupled to the tube 77 to receive water under pressure therefrom and discharge the water generally radially of the tube 77 to continuously propel the head 45.

Although various guidance mechanisms can be employed, in the illustrated embodiment, a rudder 83 is mounted for pivoting movement with the nozzle 81 in a conventional manner and causes the head 45 to move along the peripheral wall 13 in contact therewith. Thus, the head 45 moves essentially continuously along the perimeter of the pool 11. The head 45 may be of the type commercially available from DEL Industries of San Luis Obispo, Calif.

Figure 3:
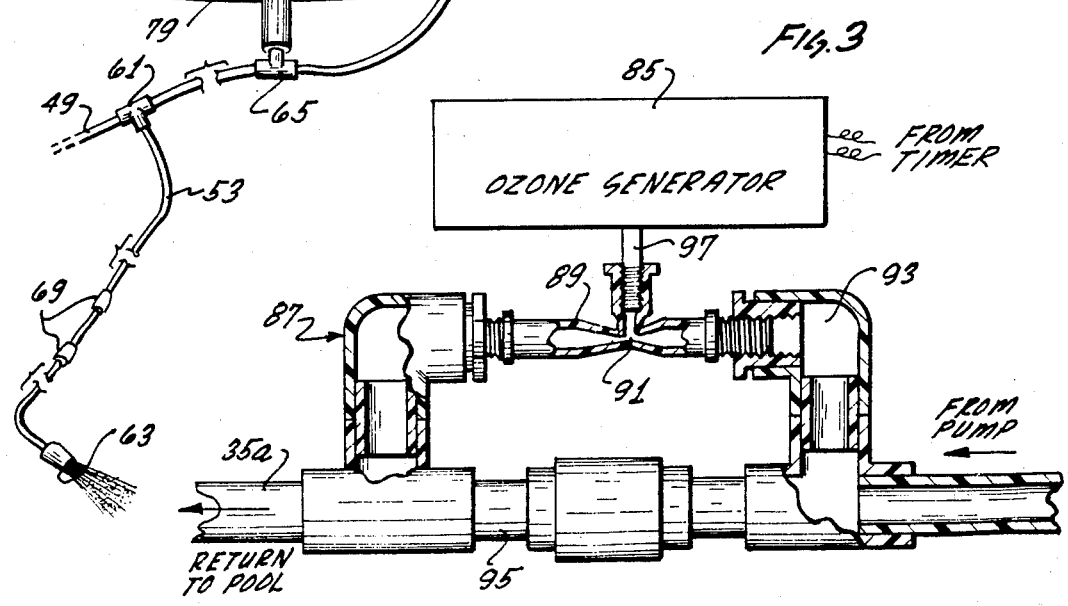
FIG. 3 is an elevational view partially in section showing one way that ozone can be injected into the water supply.

With this invention, the cleaner 43 serves not only as a cleaner, but also as an ozone injector. To accomplish this, an ozone generator 85 is coupled to an ozone injector 87, and the injector is in turn coupled to the supply conduit 35a as shown in FIGS. 1 and 3. The ozone generator 85 may be a conventional ozone generator of the type commercially available from DEL Industries of San Luis Obispo, Calif. under the trademark DEL-ZONE ®.

The ozone injector 87, in the embodiment illustrated, includes a converging-diverging nozzle 89 having a throat 91 which is coupled in a bypass conduit around a section 95 of the supply conduit 35a. A conduit 97 couples the ozone generator 85 to the throat 91 so that the ozone will be drawn into the throat 91 of the nozzle 89 by the low pressure existing there when water is flowing through the bypass conduit 93. The timer 41 also controls the ozone generator 85 so that the latter generates ozone during the time that the pump 27 is operating.

In use, the pool cleaner 43 is used in the conventional manner during the time that the pump 27 is operating. During this same time, the ozone generator 85 generates ozone, and water from the pump flows through the bypass conduit 93 to draw ozone into the water under pressure being supplied to the cleaner 43. Thus, the water under pressure with the ozone entrained therein is discharged below the surface of the water in the pool by the cleaner 43 at the discharge openings 63 and 67, as well as by the nozzle 81 of the drive 47. With this arrangement, the cleaner 43 also serves as an injector through which ozone is injected into the pool while the flexible conduits 51, 53 and 55 are being used to clean the bottom wall 15 and the peripheral wall 13 of the pool 11. The drive 47 moves the head 45 and the attached conduits 51, 53 and 55 generally horizontally through the water while the whip action from the individual flexible conduits provides a snake-like action, all of which is most effective in mixing the ozone effectively with the water so that the ozone can serve as an effective sanitizer.

The quantity of ozone injected will depend upon several variable factors, such as the volume of water in the pool, the ambient temperature, the period of pump operation, and the degree to which it is desired to eliminate or reduce chlorine treatment of the pool. By way of example, in one test an ozone generator rated at 8.5 grams of ozone per hour has been found sufficient to eliminate the need for chlorine treatment of a swimming pool of about 18'×36' in moderate temperatures for at least a four-week period.

During the periods of operation of the pump 27, water without ozone entrained therein is supplied to the pool 11 through the conduit 35b and the port 37. However, the conduit 35b could be eliminated, and the port 37 could be directly coupled to receive water with ozone entrained therein from the conduit 35a, if desired. The apportioning of water between the conduits 35a and 35b is controlled by the manual valve 36.

Although an exemplary embodiment of the invention has been shown and described, many changes, modifications and substitutions may be made by one having ordinary skill in the art without necessarily departing from the spirit and scope of this invention.

I claim:

1. A method of injecting ozone into the water of a swimming pool comprising:
    providing a swimming pool cleaner which includes a movable head, a water-responsive drive coupled to the head, and at least one flexible conduit coupled to said head and having at least one opening therein;
    placing the head and the flexible conduit into a swimming pool;
    supplying water under pressure to the flexible conduit to cause movement of the flexible conduit to clean a surface of the swimming pool and to the water-responsive drive to cause the head to move about in the pool; and injecting ozone into the water under pressure supplied to the flexible conduit discharging the ozone carried through the flexible conduit and out of said opening to mix with the water in the swimming pool.

2. A method as defined in claim 1 including discharging water under pressure with ozone therein through the water-responsive drive and into the water of the swimming pool.

3. A method as defined in claim 1 wherein said step of supplying includes supplying water from a location outside of the swimming pool to the flexible conduit and said step of injecting is carried out outside of the swimming pool.

4. An ozone injecting cleaner for a swimming pool comprising:

a movable head;

a water-responsive drive coupled to the head;

at least one flexible conduit coupled to said head and having at least one opening therein;

conduit means for supplying water under pressure to said flexible conduit to cause movement of the flexible conduit for use in cleaning a surface of the swimming pool and to the water-responsive drive to cause the head to move about in the pool;

a source of ozone; and means for injecting ozone from the source into said conduit means whereby the ozone is carried by the water under pressure through said flexible conduit and out said opening to mix with the water of the swimming pool.

5. An ozone-injecting cleaner as defined in claim 4 wherein the water-responsive drive includes a jet which discharges water under pressure with ozone therein to the swimming pool.

6. An ozone-injecting cleaner as defined in claim 4 including a plurality of said flexible conduits coupled to the head and to the conduit means so that they move and can clean one or more surfaces of the swimming pool and can discharge ozone therefrom to mix with the water of the swimming pool.

7. An ozone-injecting cleaner as defined in claim 4 wherein said injecting means includes a nozzle having a throat through which the water under pressure can pass and a conduit coupling the ozone source and the throat whereby the ozone is entrained in the water under pressure.

8. An ozone-injecting cleaner as defined in claim 4 wherein the source of ozone includes an ozone generator and said ozone-injecting cleaner includes timer means for controlling the periods during which the ozone generator generates ozone.

9. An ozone-injecting cleaner as defined in claim 4 wherein the head is floatable.

* * * * *